United States Patent
Van Den Berg et al.

(10) Patent No.: US 7,590,821 B2
(45) Date of Patent: Sep. 15, 2009

(54) DIGITAL SIGNAL PROCESSING INTEGRATED CIRCUIT WITH I/O CONNECTIONS

(75) Inventors: Henricus Hubertus Van Den Berg, Nijmegen (NL); Harpreet Singh Bhullar, Nijmegen (NL); Pieter Voorthuijsen, Groningen (NL)

(73) Assignee: NXP B.V., Eindhoven (NL)

( * ) Notice: Subject to any disclaimer, the term of this patent is extended or adjusted under 35 U.S.C. 154(b) by 293 days.

(21) Appl. No.: 10/588,889

(22) PCT Filed: Jan. 31, 2005

(86) PCT No.: PCT/IB2005/050398

§ 371 (c)(1),
(2), (4) Date: Aug. 9, 2006

(87) PCT Pub. No.: WO2005/078598

PCT Pub. Date: Aug. 25, 2005

(65) Prior Publication Data

US 2007/0132613 A1 Jun. 14, 2007

(30) Foreign Application Priority Data

Feb. 12, 2004 (EP) .................. 04100540

(51) Int. Cl.
*G06F 15/76* (2006.01)
(52) U.S. Cl. .......................... 712/11; 712/15
(58) Field of Classification Search ..... 712/11
See application file for complete search history.

(56) References Cited

U.S. PATENT DOCUMENTS

| | | | | |
|---|---|---|---|---|
| 3,815,095 A | * | 6/1974 | Wester | 712/11 |
| 4,051,551 A | * | 9/1977 | Lawrie et al. | 711/168 |
| 5,121,342 A | * | 6/1992 | Szymborski et al. | 709/224 |
| 5,450,557 A | * | 9/1995 | Kopp et al. | 712/24 |
| 5,541,862 A | * | 7/1996 | Bright et al. | 702/122 |
| 5,581,600 A | * | 12/1996 | Watts et al. | 379/88.02 |
| 5,892,934 A | * | 4/1999 | Yard | 712/203 |
| 6,456,628 B1 | | 9/2002 | Greim | |
| 7,299,307 B1 | * | 11/2007 | Early et al. | 710/33 |
| 2002/0090800 A1 | | 7/2002 | Miura et al. | |
| 2003/0062922 A1 | | 4/2003 | Douglass et al. | |

\* cited by examiner

*Primary Examiner*—Eric Coleman

(57) ABSTRACT

A digital signal processing integrated circuit contains an array of interconnected and programmed or programmable digital signal processors (10). Configurable multiplexing circuits (12), are placed between IO connections (11*a,b*) and the IO ports of at least a plurality of the digital signal processors (10). The multiplexing circuits (12) are configured under control of configuration data, so that the multiplexing circuit (12) give the effect of accessing the IO connection only to IO signals from the IO port or ports of one or ones of the respective plurality of digital signal processors (10) that are selected by the configuration data. Preferably, each digital signal processor (10) has its IO part coupled in common to a plurality of the multiplexing circuits (12) separately from the other digital signal processing circuits. Preferably, the multiplexing circuit (12) is arranged to associate a control signal value for a peripheral circuit with respective, independently configurable IO signal values from different ones of the respective digital signal processors (10) respectively.

12 Claims, 3 Drawing Sheets

DIGITAL SIGNAL PROCESSING INTEGRATED CIRCUIT WITH I/O CONNECTIONS

The invention relates to digital signal processing and in particular to digital signal processing circuits with multiple programmed digital signal processors that operate in parallel.

Digital signal processing circuits are ubiquitous in modern consumer electronic equipment. Signal processing circuits differ from general computers in that they receive and/or output real-time or near real time signal streams, such as audio or video signal streams, for reception, transmission, rendering, recording purposes etc. The same processing operations are applied over and over again to data from these streams for an indefinite time period. Application specific equipment is typically permanently programmed to perform just these processing operations.

Real time or near real-time signal stream processing is needed, which requires a high processing capacity. U.S. Pat. No. 6,456,628 discloses how multiple circuit boards with digital signal processors can be used in parallel to provide high processing capacity. In order to fully utilize the processing capacity of parallel processors communication bottlenecks are counteracted. For this purpose the digital signal processors in this patent have, in addition to a shared bus connection, local (single processor to single processor) communication connections between selected pairs of digital signal processors. Moreover, each digital signal processor has its own external I/O interface outside the shared bus to a daughterboard. This is typical for digital signal processing. In general computers the I/O interfaces are normally connected via the shared bus, but in a digital signal processing system this would interfere with the real time nature of most signal streams.

In operation, each digital signal processor is typically programmed to execute a respective different part of a complex processing operation. Typically, a front-end digital signal processor is programmed to input a stream of signal samples and to perform a first processing operation repeatedly on respective samples of the stream. The front-end digital signal processor passes the results of the first processing operation to a next digital signal processor, via a local connection. The next digital signal processor is programmed to perform a second processing operation and to pass its results and so on, on to a back-end digital processor outputs a stream of processed signal samples.

Obviously, the cost of this type of multi-processor system can be controlled by adapting the number of digital signal processor boards to the needs of an application. For a given application a set of programs is written for the different signal processors, the necessary number of digital signal processing boards is installed and the stream inputs and outputs are coupled to the external I/O interface of the processing boards that form the front-end and back-end of the system.

Integration of such a signal processing system seems straightforward. One merely has to realize the circuits from the circuit boards in an integrated circuit and connect input and output pins of the integrated circuit to the external I/O interfaces of the digital signal processors that form the front-end and back-end of the system.

However, to reduce design costs, it is desirable that, once such a type of signal processing integrated circuit has been designed for a specific application and prepared for production, the design can easily be modified to make new types of signal processing integrated circuits for related applications. As far as this only involves replacing the programs of the original type, such a redesign can be made at low cost. But it has been found that inefficiencies arise when such an integrated circuit has to be reprogrammed, when the inputs and outputs are connected specifically to digital signal processors that are chosen for the original application. A reprogrammed application can become inefficient if the front end and back end functions cannot be moved from specific digital signal processors. On the other hand it is also inefficient to increase signal traffic between the digital signal processors to transport signal data to and from the front end and back end processors when front end or back end processing is moved from the processors that have I/O connections for the signal streams.

Among others, it is an object of the invention to provide for a signal processing integrated circuit with a plurality of interconnected digital signal processors that can efficiently be reprogrammed.

Among others, it is an object of the invention to relax constraints on the movement of functions over different digital signal processors in an integrated circuit with a plurality of interconnected digital signal processors.

Among others, it is an object of the invention to facilitate reduction of power consumption in an integrated circuit.

According to the invention a signal processing integrated circuit is provided with a configurable multiplexing circuit between an IO connection and a plurality of signal processors ("IO connection" as used herein means a connection external to an array of digital signal processors in the integrated circuit; the IO connection may connect to a peripheral circuit in the same integrated circuit). The configurable multiplexing circuit can be configured with configuration data. The multiplexing circuit receives IO control signals from the plurality of signal processors but gives effect only to IO control signal from signal processors that are selected by the configuration data. Thus, within a single integrated circuit design different digital signal processors can be configured to perform a front-end task that inputs a stream of data in a distributed signal processing operation, dependent on the distribution of the tasks over an array of digital signal processing circuits. The same goes for back end tasks that output a stream of data.

Preferably, the IO port of at least one of the digital signal processors is coupled to a plurality of such configurable multiplexing circuits for different IO connections, at most one of the multiplexing circuits being configured to respond to IO control signals from that digital signal processor. Thus, the digital signal processor can be configurably attached to a selected IO connection. No conflicts between different digital signal processors arise at the different IO connections, because the configuration data ensures that only one digital signal processor has access to the IO connection. Therefore, one may omit arbitration between connected digital signal processors for access to the IO connection, by always granting any configurably selected digital signal processor unconditional access. This saves time and circuit area.

In an embodiment the multiplexing circuit is configured to respond to selected IO addresses from the IO ports of selected digital signal processors. When the multiplexing circuit recognizes a configured IO address from a digital signal processor the multiplexing circuit enables access by that digital signal processor. Preferably different IO addresses are configurably associated with different control signal values for a peripheral circuit that is coupled to the IO connection. Thus, no peripheral specific connections are needed at the digital signal processors, making it easy to use different ones of the digital signal processors as front or back end.

Preferably, the configuration data is set under control of programs executed by the digital signal processing circuits themselves. This makes configuration self-contained. In addition it makes it possible to perform dynamic switching between signal processing tasks under program control, wherein the execution of front end and/or back end tasks is shifted from one digital signal processor to another.

In an embodiment, the digital signal processors of a given integrated circuit are permanently programmed, using a ROM program memory for example, and the multiplexing circuit is likewise permanently configured to couple an IO connection permanently to a single digital signal processor. In this case the fact that the connection is programmable has no function in a given integrated circuit, but merely makes it possible to manufacture different integrated circuits with different programs, in which the IO connections are coupled to other digital signal processors with a minimum of design changes.

These and other objects and advantageous effects of the invention will be described by means of examples illustrated in the figures.

Figure 1:
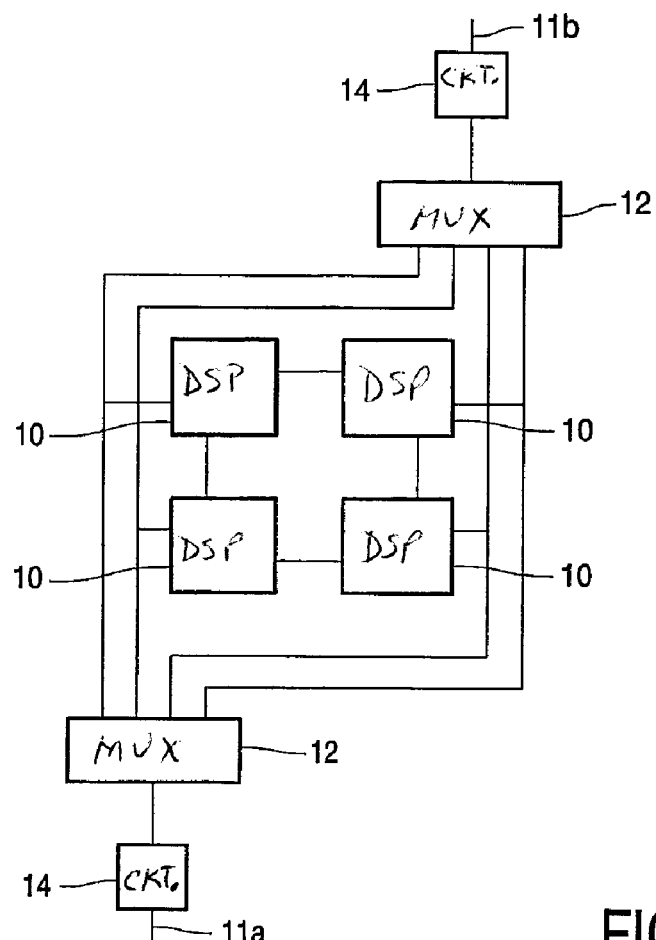
FIG. 1 shows an integrated signal processing circuit.

FIG. 1 schematically shows an integrated signal processing circuit. The integrated signal processing circuit contains an array of instruction based digital signal processors 10, an external input 11a, an external output 11b, multiplexing circuits 12 and peripheral circuits 14. Digital processors 10 have neighbor interconnections to their nearest neighbors (although a 2×2 matrix of digital signal processors 10 is shown with two nearest neighbor connections for each digital signal processor 10, it will be appreciated that differently sized matrices may be used, with different numbers of neighbor connections, for example only to nearest neighbors, or to nearest neighbors and next nearest neighbors etc.).

External input 11a is coupled to a first terminal of a first multiplexing circuit 12 via a peripheral circuit 14. First multiplexing circuit 12 has second terminals coupled to each of digital signal processors 10. External output 11b is coupled to a first terminal of a second multiplexing circuit 12 via a peripheral circuit 14. Second multiplexing circuit 12 has second terminals coupled to each of digital signal processors 10. Although single lines are shown, it should be understood that each terminal, in fact, may contain a plurality of connections in parallel, such as a number of data connections for respective data bits, a number of address connections for respective address bits and control connections such as a read/write and/or an enable connection.

Figure 2:
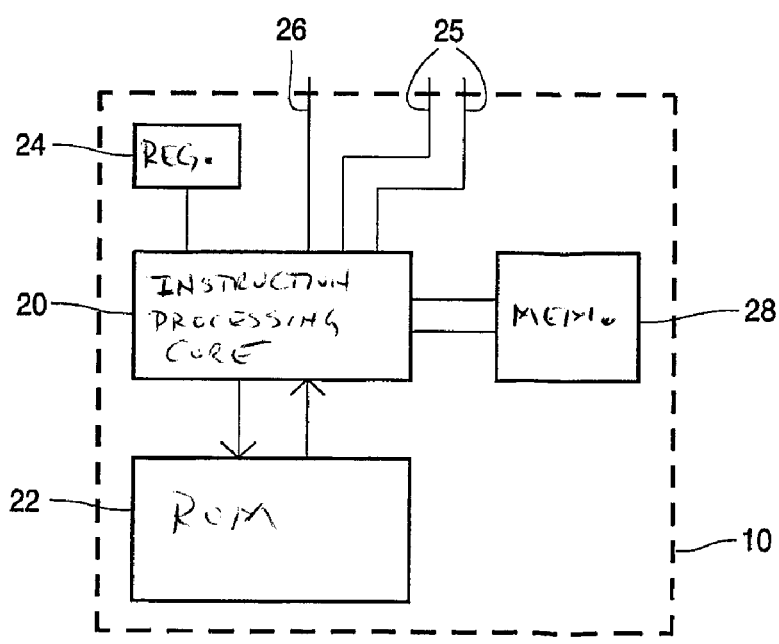
FIG. 2 shows an architecture of a digital signal processor

FIG. 2 shows an example of an architecture of a digital signal processor 10. In this architecture digital signal processor 10 contains an instruction processing core 20, a read only program memory 22, a register file 24, communication ports 25 for coupling to a neighboring digital signal processors (not shown) in the matrix, an IO port 26 for coupling to multiplexing circuits 12 (not shown) and a data memory 28 (additionally a separate coefficient memory (not shown) may be provided when using a double Harvard architecture). Although IO port 26 is shown as a single line, it should be understood that each may represent a plurality of signal conductors, e.g. six IO address conductors and thirty-two data conductors and control conductors. Communication ports 25 similarly may comprise many conductors. Instruction processing core 20 has an instruction fetching input coupled to program memory 22, operand read and write inputs and outputs coupled to ports 25, 26 and a data read/write interface coupled to data memory 28.

In operation, when the integrated circuit is started up, signal processors 10 write control data to multiplexing circuits 12. The control data values for respective ones of the multiplexing circuits are determined by read only data from program memories 22 of digital signal processors. The control data controls each multiplexing circuit 12 to establish selective connections between digital signal processors 10 and the relevant external connection 11a,b, via a peripheral circuit 14.

Subsequently, digital signal processors execute signal processing instructions from their program memories 22, to perform signal processing operations. The program for a first and second single one of the digital signal processors 10 also includes instructions to read and write signal data from and to the ports coupled to the first and second multiplexing circuit 12 respectively. Typically the circuit is arranged so that these instructions are dedicated IO read and write instructions with an instruction code specific for reading or writing from an IO port such as the one connected to multiplexing circuit 12, but instead the circuit may be arranged so that register read instructions with a register address corresponding to the multiplexer port can be used to access an IO port, or memory mapped read and write instructions that can also be used to address data memory 28 may be used to access an IO port, when appropriate addresses are used.

Digital signal processors 10 also communicate signal data via the nearest neighbor connections, so that digital signal processors that do not read or write directly to multiplexing circuits 12 can also perform signal processing operations using intermediate signal values computed from signal values at the external input 11a and affect signal values at the external output 11b.

Figure 3:
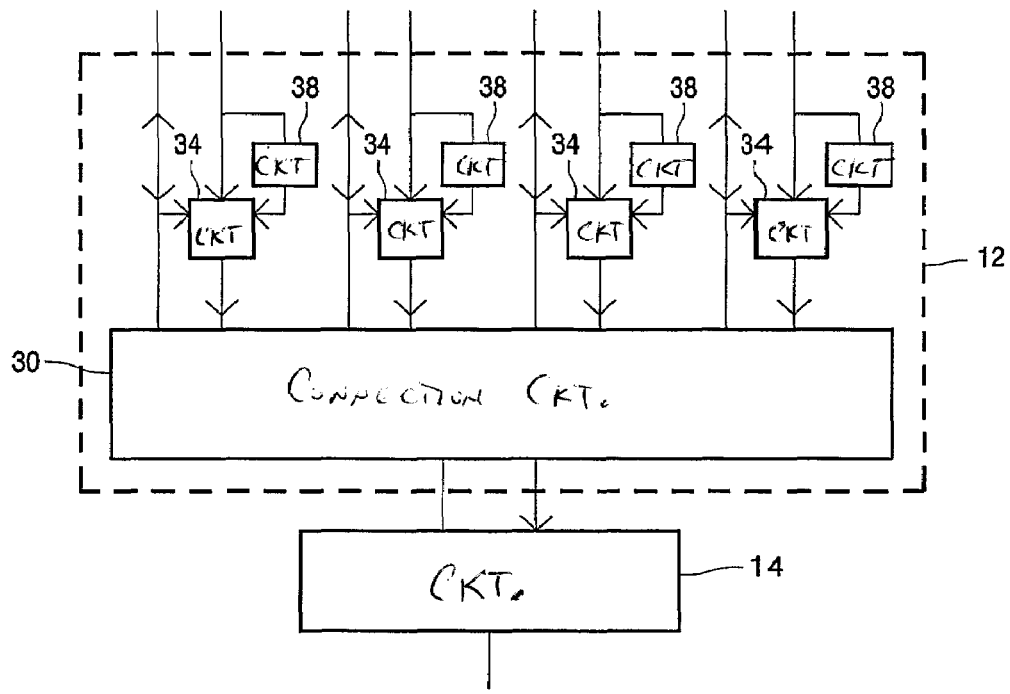
FIG. 3 shows a multiplexing circuit

FIG. 3 shows an embodiment of a multiplexing circuit 12, containing a connection circuit 30, translation circuits 34, and an update circuit 38. Each translation circuit 34 has inputs coupled to the address lines and control lines of a respective one of digital signal processors 10 (not shown) and an output coupled to connection circuit 30. Data lines of a respective one of digital signal processors 10 (not shown) are coupled directly to connection circuit 30. Connection circuit 30 has IO control outputs and data inputs/outputs (32 bits per input for example) coupled to peripheral circuit 14. Connection circuit 30 is arranged to pass data between a selectable one of the digital signal processing circuits and peripheral circuit 14. Connection circuit 30 is also arranged to pass control data from the translation circuits 34 to peripheral circuit 14.

It will be appreciated that, although single data and control lines are shown connected to peripheral circuit 14, in fact more than one connection may be provided in parallel. The number of control lines to peripheral circuit 14 may even be different for different peripheral circuits, dependent on the type of peripheral circuit 14.

In operation, digital signal processors 10 initially write configuration data to translation circuits 34. Each translation circuit 34 corresponds to a respective combination of a digital signal processor 10 and a peripheral circuit 14. The configuration data for each particular translation circuit 34 specifies whether IO control signals and/or data from the corresponding digital signal processor 10 should be exchanged with the corresponding peripheral circuit 14 or not. If so, the configuration data for the particular translation circuit 34 specifies which one or more IO addresses that, when supplied by the corresponding processor 10 on its IO port 26, the particular translation circuit 34 should respond to. Preferably, the configuration data also specifies the control signal or signals that the particular translation circuit 34 must supply to the corresponding peripheral circuit 14 when the corresponding digital signal processor 10 supplies respective addresses.

For example, one IO address may be specified only, so that the particular translation circuit 34 passes data from IO port 26 only if the corresponding processor 10 supplies that IO address. In another example, several IO addresses may be specified, each in combination with a respective set of control signals for the corresponding peripheral circuit 14, e.g. one address for supplying data from a status register in peripheral circuit 14 to IO port 26 and another address for supplying signal data from a signal data register in peripheral circuit 14 to IO port 26.

Typically, each digital processor 10 writes configuration data so that the translation circuit 34 for at most one of the peripheral circuits 14 will respond to one or more IO addresses from the digital signal processor 10, and different digital signal processors 10 typically write configuration data so that the translation circuit 34 for different peripheral circuits 14 will respond to one or more IO addresses from different digital signal processor 10. Thus, each peripheral 14 is accessed by a respective one of digital signal processors 10. However, in an embodiment, the configuration data allows multiple digital signal processors 10 to access the same peripheral 14, each using its own defined IO addresses. In this or another embodiment, the configuration data allows a digital signal processor 10 to access multiple peripherals 14. Typically, in this case, the digital signal processor 10 sets the configuration data so that translation circuits 34 for the different peripherals 14 will respond to different addresses. Thus, the digital signal processor is able to address different peripherals by issuing different IO addresses. However, in an embodiment the same addresses may be configured, e.g. combinations of data from different peripherals must be read.

In the embodiment shown digital signal processors 10 supply the configuration data via the data lines of the IO ports. Update circuit 38 detects whether a specific IO address associated with a configuration update is supplied and if so update circuit 38 makes translation circuit 34 update the configuration data with data from the IO port 26 of the digital signal processor 10. For example one predetermined IO address from IO port 26 may be used to signal that the accompanying data from IO port 26 represents one or more IO addresses for which configuration data is to be stored. Optionally another predetermined IO address may be used to signal that the accompanying data from the IO port 26 represents configuration data to be stored in association with a previously specified address.

After writing the configuration data signal processors 10 start executing signal processing programs from program memory 22. During execution of the signal processing programs, digital signal processors 10 execute IO instructions, which result in the application of instruction dependent IO addresses on IO port 26. The translation circuits 34 that are coupled to the IO port detect whether the IO addresses match configured addresses for the translation circuits 34. If the IO address matches for a particular translation circuit 34, the translation circuit 34 controls connection circuit 30 to pass data between the digital signal processor 10 and the peripheral that correspond to the translation circuit and/or to pass control signals that have been defined for the IO address by the configuration data.

For example, in response to a configured address a translation circuit 34 supplies read control data to the peripheral circuit 14 via connection circuit 30 and controls connection circuit 30 to pass read data from peripheral 14 to IO port 26. In another example, in response to a configured address a translation circuit 34 supplies write control data to the peripheral circuit 14 via connection circuit 30 and controls connection circuit 30 to pass write data from IO port 26 to peripheral 14.

Figure 4:
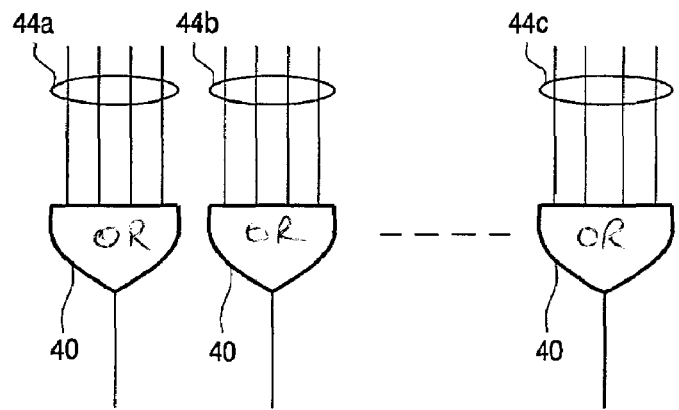
FIG. 4 shows a control signal interface in a multiplexing circuit

FIG. 4 shows an embodiment of a control part of connection circuit 30. This embodiment contains a plurality of OR gates 40, each with a respective set of inputs 44a-c. Three OR gates 40 are shown by way of example, but it should be understood that the number of OR gates depends on the number of control connections of peripheral circuit 14. The inputs 44a-c of each OR gate 40 are coupled to outputs of respective ones of the translation circuits 34. The outputs of the OR gates 40 are coupled to the peripheral circuit 14. Thus, in operation, the peripheral circuit 14 receives the logic OR of output signals from translation circuits 34 that correspond to different digital signal processors 10. In this embodiment translation circuits 34 are arranged so that they supply logic zeros when they do not receive the configured addresses.

A noteworthy point is that no arbitration is performed. Conflicts due to simultaneous IO addresses on IO ports 26 of the different digital signal processors 10 are avoided by the configuration of the multiplexing circuit 12, which responds only to configured ones of the digital signal processors. As a result, a normal fast logic circuit can be used between the IO ports and the peripheral circuit 14, without tri-state drivers or arbiters that suffer from metastable conditions. Access is guaranteed within one or a predetermined number of cycles to ensure real-time behaviour and system predictability.

Figure 5:
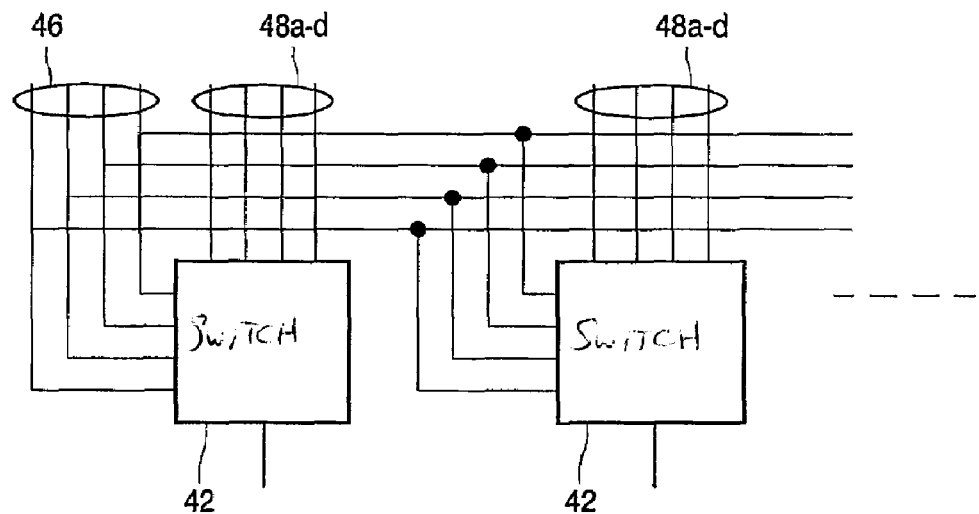
FIG. 5 shows a data signal interface in a multiplexing circuit

FIG. 5 shows an embodiment of a data part of a connection circuit. This embodiment contains N to 1 switches 42 for respective bits of the IO data (N being the number of digital signal processors 10), with first side connections 48a-d of each switch 42 coupled to the IO ports of respective ones of the signal processors 10. Second side connections of each switch 42 are coupled to the peripheral circuit 14. Switches 42 are controlled via control lines 46 from translation circuits 34 which control whether switches 42 connect the data lines of the digital signal processor 10 that correspond to translation circuit 34 to peripheral circuit 14. In operation, translation circuits 14 selectively activate the control lines dependent on whether IO addresses from digital signal processors 10 match configured addresses.

In an embodiment switches 42 are implemented by two-way switching elements (not shown). In another embodiment tri-state drivers may be used, which drive signals from the peripheral circuit 14 to the IO ports 26 of the digital signal processors 10 or vice versa, dependent on whether a read or write control signal is received from the IO port, if the IO address on the IO port 26 matches a configured address. In general, no arbitration circuit is provided to exclude that more than one of the digital signal processors 10 writes to the same peripheral circuit 14 at the same time, or that more than one peripheral circuit 14 is connected to the same signal processor 10 at the same time: the signal processors operate in lock-step and are programmed so that such conflicts do not occur, or if they occur, that no damaging effect will result.

In yet another embodiment separate data read and write line may be provided in IO port 26. In this embodiment logic circuits may be used instead of switches to form write signals to the peripheral circuits and read signals to the IO ports 26 of the digital signal processors 10. The write signals for a peripheral circuit 14 are formed for example as the logic OR of enabled data from different digital signal processors 10, enablement being controlled by translation circuits 14. The read data may be formed as the logic OR of enabled data from different peripheral circuits 14, enablement being controlled by translation circuits 14.

Each translation circuit 14 may be realized as a memory for example, with memory locations for different addresses. In this embodiment the IO address from digital signal processor 10 is used to address the memory and data from the memory is supplied to connection circuit 30 as control data. During configuration appropriate control data is stored in memory locations with addresses selected by digital signal processors 10.

Figure 6:
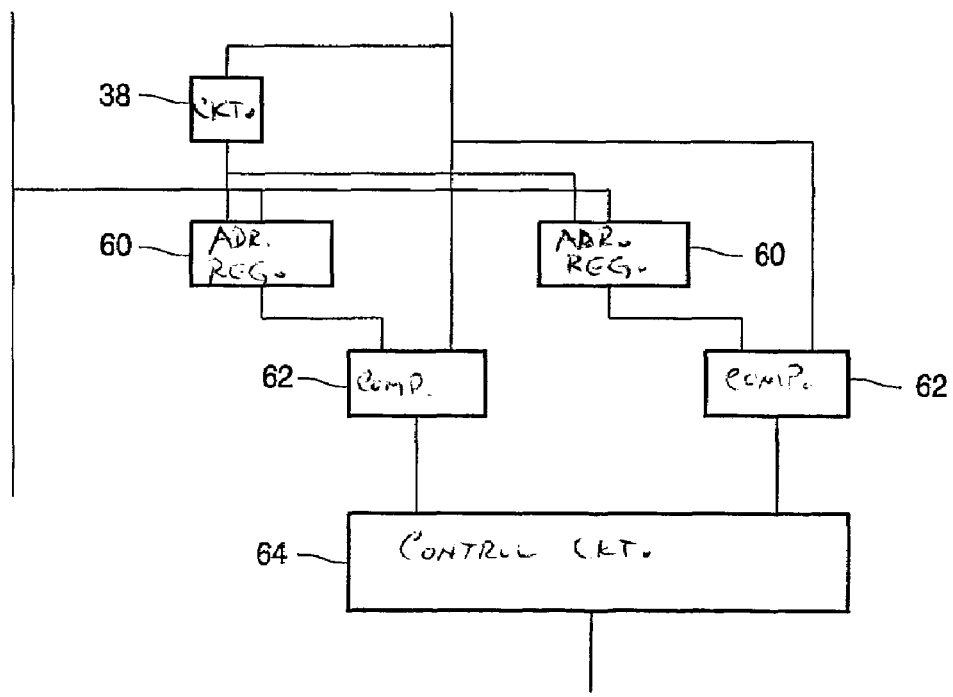
FIG. 6 shows an embodiment of a translation circuit

FIG. 6 shows another embodiment of a translation circuit. This embodiment contains address registers 60, address comparators 62 and a control signal generating circuit 64. Address comparators 62 have first inputs coupled to the address input from IO port 26 of a corresponding digital signal processor 10 and second inputs coupled to outputs of address registers 60. Address comparators 62 have outputs coupled to control signal generating circuit 64. Address registers 60 have inputs coupled to the data lines of the IO port 26 of the corresponding digital signal processor 10 and clocking inputs coupled to an output of update circuit 38. Although two comparator-register pairs are shown, it should be understood that any number (e.g. one, two, three or more) may be used.

In operation, address registers 60 latch data from the data lines of IO port 26 of the corresponding digital signal processor 10 when the digital signal processor 10 outputs a predetermined address on its IO port 26. Typically, different fields from the data are latched in different registers. As an example, four addresses from different six bit address fields from a 32 bit data word may be latched in address registers 60. During normal operation comparators 62 compare the latched addresses with addresses supplied from the IO port 26 of the corresponding digital signal processor 10. If a match occurs a signal is supplied to control signal generating circuit 64, which generates one or more control signal for peripheral circuit 14 and/or connection circuit 30 in response. In an embodiment, control signal generating circuit 64 defines predetermined control signals for respective ones of its inputs and generate the predetermined control signal when a signal is received from a comparator at a specific input. In another embodiment the control signals may be programmable as well. The use of comparators instead of an addressable memory has the advantage that faster translation is possible, without requiring additional clock cycles.

Although the invention has been described using a specific embodiment it will be understood that many variations are possible without deviating from the invention. For example, although an array of digital signal processors 10 was shown wherein all digital signal processors are coupled to all multiplexing circuits 12 for respective peripheral circuits 14, it will be understood that in practice, especially if large arrays of digital signal processors 10 are used, only a subset of a plurality of digital signal processors 10 may be coupled to a multiplexing circuit 12. For example, if the digital signal processors 10 have mutual neighbor connections according to a matrix of rows and columns, a single column of digital signal processors 10 may be coupled to a multiplexing circuit only. This maintains flexibility in the location of signal processing programs, but saves on circuitry e.g. for translation circuits It will be understood that any number of digital signal processors 10 may be used, connected in any possible topology.

As another example, instead of programming the configuration data from the digital signal processors, a common control processor may be used to program the configuration data. A micro-controller core may be added to the integrated circuit for this purpose, and arranged to execute a program that writes the configuration data to the multiplexing circuits 12. This has the advantage that the programs of digital signal processors 10 do not need to contain any information about configuration. However, it requires additional connections to the micro-controller, and it means that changes to the programs of the digital signal processors 10 that involve movement of input or output tasks also involve changes of the program of the micro-controller. In another embodiment, the configuration data is permanently programmed into the multiplexing circuits 12 themselves, e.g. during manufacture.

Although the invention has been described for one-time configuration before the start of signal processing, it should be understood that dynamic reconfiguration may be provided for in some applications. In this case, after performing a first signal processing operation on a signal stream for some time interval, a switch is made to a second signal processing operation, for example in response to a user command. Programs for performing both the first and second signal processing operation may be provided in the digital signal processors 10. It may be the case that the distribution of signal processing tasks over the different signal processing circuit is different for the different operations, so that the signal streams should enter and/or leave the array of digital signal processors 10 at different points in case of the first and second signal processing operation. If so, the digital signal processors 10, or a common controller, preferably write new configuration data to the multiplexing circuit before the digital signal processors 10 start to execute the second signal processing operation.

Preferably, the configuration data is arranged so that IO addresses from an IO port 26 will result into a connection to a single peripheral circuit 14 at a time (by configuring only one peripheral circuit to respond addresses, or by using different addresses for different peripheral circuits 14). However, without deviating from the invention it may be possible to address more than one peripheral circuit 14 with the same address. In this way for example, data may be written to more than peripheral circuit 14 at a time or, if the peripheral circuits 14 drive different subsets of the data lines of the IO port 26, a combination of data from more than one peripheral circuit 14 may be read.

Furthermore, it will be understood that the invention is not limited to implementation details of the examples. For example, some or all digital signal processors 10 may have more than one IO port, in which case part of the IO ports may be connected to part of the multiplexing circuits and other IO ports may be connected to other multiplexing circuits. Any address and data word width and interface type may be used for the IO ports.

Any type of peripheral circuit 14 may be used with its own dedicated interface type, to produce or consume a series of signal values, where the series in principle may continue for any indefinite time interval. For example an audio input peripheral may be used, which streams left and right channel sound sample values. In this case, different IO addresses may correspond to reading of left and right channel data and repeated reading with the same control signals is used to read sample values for successive sampling time points. In another example an audio output peripheral circuit may be used, or a video signal input/output, or the peripheral may be a dedicated processing circuit, such as a DCT transform circuit, an error correcting encoder or decoder etc., wherein repeated reading or writing with the same control signals is used to read sample values for successive sampling time points or image locations for example. Each may require its own form of control signals, which are all generated by the digital signal processors 10 by issuing respective addresses at the IO ports 26.

The invention claimed is:

1. A digital signal processing integrated circuit comprising:
   an array of interconnected and programmed or programmable digital signal processors, at least some of the digital signal processors having IO ports, said digital signal processors including programs for establishing interconnections among said digital signal processors;
   an IO connection for communicating a signal stream between signal processors in the array and circuitry outside the array;
   a configurable multiplexing circuit between the IO connection and the IO ports of at least a plurality of the digital signal processors, the multiplexing circuit being configurable under control of configuration data, the multiplexing circuit being arranged to give the effect of accessing the IO connection only to IO signals from the IO port or ports of one or ones of the respective plurality of digital signal processors that are selected by the configuration data, wherein execution of programs within said digital signal processors determines a configuration state of said configurable multiplexing circuit.

2. A digital signal processing integrated circuit according to claim 1, wherein the multiplexing circuit is arranged to give unconditional, arbitration free access from the IO port of the selected one or ones of the plurality of digital signal processors to the IO connection.

3. A digital signal processing integrated circuit according to claim 1, comprising a plurality of IO connections including said IO connection and a plurality of configurable multiplexing circuits including said configurable multiplexing circuit, each configurable multiplexing circuit coupling a respective IO connection to IO ports of at least a respective plurality of the digital signal processors, each multiplexing circuit being arranged to give the effect of accessing the IO connection only to IO signals from the IO port or ports of one or ones of the respective plurality of digital signal processors that are selected by the configuration data for that multiplexing circuit, the IO port of at least one of the digital signal processors being coupled in common to a plurality of the multiplexing circuits separately from the IO ports of other digital signal processors.

4. A digital signal processing integrated circuit according to claim 1, comprising a peripheral circuit coupled to a respective one of the IO connections the peripheral circuit having a control input, the peripheral circuit being responsive to respective control signal values at the control input, the multiplexing circuit associating each control signal value with a respective IO signal value selected under control of the configuration data, the multiplexing circuit being arranged to translate the IO signals from the IO ports of the selected one or ones of the digital signal processors into the respective control.

5. A digital signal processing integrated circuit according to claim 4, wherein the multiplexing circuit is arranged to associate a control signal value with respective, independently configurable IO signal values from different ones of the respective digital signal processors respectively.

6. A digital signal processing integrated circuit according to claim 1, wherein the digital signal processors are arranged to execute IO instructions that specify an IO address, the IO ports having address lines for outputting the IO address, the multiplexing circuit being arranged to configurably associate each selected digital signal processor that is connected to the multiplexing circuit to a respective configurable IO address value, the multiplexing circuit being arranged to enable transport of data between the respective connection and the IO port of a particular one of the digital signal processors in response to receiving from the IO port of that particular one of the signal processing circuits, the IO address value that is configurably associated with that particular one of the signal processing circuits.

7. A digital signal processing integrated circuit according to claim 4, wherein the multiplexing circuit comprises;
   a plurality of configuration data storage elements;
   a plurality of comparators, each comparator having a first input coupled to a respective one of the configuration data storage elements and a second input coupled to the IO port of a respective one of the digital signal processors for receiving IO addresses;
   a control signal generating circuit having inputs coupled to outputs of the comparators and arranged to enable transport of data between the IO connection and the IO port of those digital signal processors for which the comparators indicate a match.

8. A digital signal processing integrated circuit according to claim 1, wherein the configuration data in the multiplexing circuits is programmable under control of signals from the IO ports of the digital signal processors.

9. A digital signal processing integrated circuit according to claim 1, wherein the digital signal processors are programmed to perform a signal processing operation that comprises a plurality of tasks, each task executed by a respective one of the digital signal processors, the integrated circuit comprising neighbor interconnections between digital signal processing circuits in the array, in which signal processing operations signal streams flow between respective tasks via the interconnections and to front end and/or from back end tasks of each tasks from and to the IO connections respectively, and wherein the digital signal processing integrated circuit is programmed to establish a configuration wherein the multiplexing circuits are configured so that only IO signals from the IO ports of one or ones of the respective plurality of digital signal processors that execute the front end and/or back end tasks have the effect of accessing the respective IO connections.

10. A digital signal processing integrated circuit according to claim 9, wherein each particular digital signal processor that executes a particular front end and/or back end task is programmed to write the configuration data to the multiplexing circuits to establish a configuration wherein the multiplexing circuits access the IO connection with which the front end and/or back end task exchanges the signal streams in response to IO signals from that particular digital signal processor.

11. A method of executing a signal processing operation that inputs and/or outputs a stream of signal data, the method comprising the steps of
   executing different tasks that are part of the signal processing operation by executing respective programs in respective digital signal processors in an integrated circuit,
   communicating intermediate streams of data between tasks in different digital signal processors, the digital signal processors including a particular digital signal processor that executes a front end and/or back end task that contains an IO instruction for receiving and/or transmitting signals from an external stream of signal data;
   prior to said executing, programming configuration data of a multiplexing circuit that is coupled between an IO connection and IO ports of at least a plurality of the digital signal processors, the configuration data controlling the multiplexing circuits to give the effect of accessing the respective IO connection only to IO signals from the IO port of the particular digital signal processors that are selected by the configuration data, wherein execution of programs within said at least one digital signal processor utilizing said configuration data determines a configuration state of said configurable multiplexing circuit.

12. A method according to claim 11, wherein a switch between programmed signal processing operation is executed, the switch comprising reprogramming the configuration data, so that mutually different ones of the digital signal processors execute the front end/or back end task before and after the switch.

* * * * *